United States Patent
Rittner et al.

(10) Patent No.: US 9,016,278 B2
(45) Date of Patent: Apr. 28, 2015

(54) REGULATION VALVE FOR A LIFE SUPPORT SYSTEM

(75) Inventors: Wolfgang Rittner, Ahrensbok (DE); Rudiger Meckes, Berkenthin (DE)

(73) Assignee: Zodiac Aerotechnics, Plaisir (FR)

( * ) Notice: Subject to any disclaimer, the term of this patent is extended or adjusted under 35 U.S.C. 154(b) by 721 days.

(21) Appl. No.: 13/189,701

(22) Filed: Jul. 25, 2011

(65) Prior Publication Data

US 2013/0025590 A1    Jan. 31, 2013

(51) Int. Cl.
| | | |
|---|---|---|
| *A62B 18/10* | (2006.01) | |
| *A62B 17/00* | (2006.01) | |
| *A62B 7/00* | (2006.01) | |
| *A61M 15/00* | (2006.01) | |
| *F16K 31/26* | (2006.01) | |
| *B64D 11/00* | (2006.01) | |
| *B64D 10/00* | (2006.01) | |
| *A62B 7/14* | (2006.01) | |
| *A62B 9/02* | (2006.01) | |

(52) U.S. Cl.
CPC .......... *B64D 10/00* (2013.01); *B64D 2010/002* (2013.01); *A62B 7/14* (2013.01); *A62B 9/02* (2013.01); *Y10S 137/908* (2013.01)

(58) Field of Classification Search
CPC ............ A62B 9/02; A62B 7/14; B64D 10/00; B64D 10/002; B64D 10/005
USPC ............. 128/201.22–202.11, 202.13, 202.19, 128/204.18, 204.21, 204.26–204.29, 128/205.24, 200.24, 205.11; 244/118.5; 137/81.1, 908
See application file for complete search history.

(56) References Cited

U.S. PATENT DOCUMENTS

| | | | | | |
|---|---|---|---|---|---|
| 3,060,933 | A | * | 10/1962 | Hellquist | 128/204.25 |
| 3,077,881 | A | * | 2/1963 | Sprague | 128/204.28 |
| 3,103,927 | A | * | 9/1963 | Henneman et al. | 128/201.28 |

(Continued)

FOREIGN PATENT DOCUMENTS

| | | |
|---|---|---|
| DE | 2046016 | 4/1971 |
| GB | 861720 | 2/1961 |

(Continued)

OTHER PUBLICATIONS

Search Report dated Feb. 22, 2012 in related European Patent Application No. 11175253.1.

*Primary Examiner* — Jackie T Ho
*Assistant Examiner* — Mark K Han
(74) *Attorney, Agent, or Firm* — Kilpatrick Townsend & Stockton LLP; Dean W. Russell, Esq.; Kristin M. Crall, Esq.

(57) ABSTRACT

There is provided a regulation valve for a life support system for use in an aircraft cabin. The valve may have a gas inlet, an air mask supply outlet connected to the gas inlet, and a pressure vest branch interconnected between the gas inlet and an opening. The valve may further have a decompression valve adapted to inhibit gas flow from the pressure vest branch to the air mask supply outlet if pressure in the aircraft cabin decreases below a predetermined value, a one-way valve adapted to inhibit gas flow from the pressure vest branch to the air mask supply outlet at a predetermined pressure difference between the pressure vest branch and the gas inlet, and a one-way dump valve adapted to direct gas from the pressure vest branch to the environment at the predetermined pressure difference between the pressure vest branch and the gas inlet.

11 Claims, 2 Drawing Sheets

(56) References Cited

U.S. PATENT DOCUMENTS

| | | | | |
|---|---|---|---|---|
| 3,430,642 A | * | 3/1969 | Mack | 137/39 |
| 3,672,384 A | | 6/1972 | Hellquist | |
| 4,230,097 A | * | 10/1980 | Beaussant et al. | 600/19 |
| 4,858,606 A | * | 8/1989 | Hamlin | 128/204.29 |
| 5,199,426 A | * | 4/1993 | Aldworth et al. | 128/205.24 |
| 5,247,926 A | * | 9/1993 | Harral | 128/202.11 |
| 5,269,295 A | * | 12/1993 | Foote et al. | 128/204.18 |
| 5,314,402 A | * | 5/1994 | Foote et al. | 600/20 |
| 5,542,447 A | * | 8/1996 | Foote et al. | 137/113 |
| 5,701,889 A | * | 12/1997 | Danon | 128/204.29 |
| 5,961,442 A | * | 10/1999 | Meckes | 600/20 |
| 6,805,121 B1 | * | 10/2004 | Flood et al. | 128/204.26 |
| 6,994,086 B1 | * | 2/2006 | Martinez et al. | 128/204.26 |

FOREIGN PATENT DOCUMENTS

| | | |
|---|---|---|
| GB | 907390 | 10/1962 |
| GB | 1003401 | 9/1975 |

* cited by examiner

REGULATION VALVE FOR A LIFE SUPPORT SYSTEM

BACKGROUND

1. Field of the Invention

The invention relates to a regulation valve for a life support system for use in an aircraft cabin, in particular for life support of a pilot, crew member or a passenger in an aircraft cabin.

2. Description of Related Art

Several kinds of support systems are known for supporting pilots in an aircraft cabin. In one type of these systems a so called OBOGS (On-Board Oxygen Generating System) unit supplies the pilot with oxygen extracted from bleed air taken from the aircraft engines.

Today's life support systems for aircraft pilots with an OBOGS unit comprise a T-piece that connects a channel for breathable gas with a pressure vest. In case of rapid decompression, i.e. rapid decrease of pressure, in the aircraft cabin it is important for life support of the pilot to supply the pilot with air having a high oxygen concentration so that the pilot is prevented from getting unconscious. The air with high oxygen concentration is provided by a separate oxygen backup unit. Often, such oxygen is provided to the pilot at increased pressure to optimize oxygen uptake in the lung of the pilot. In such a case, the pilot preferably wears a tight, pressurized vest to facilitate breathing action and to prevent injuries of the chest resulting from high pressure ventilation.

Furthermore, life support systems are known comprising a non-return pressure vest valve, wherein air from inside the pressure vest is exhausted through the valve to the environment when the pilot wearing the pressure vest breathes in at a predetermined ambient pressure. When the pilot exhales, the pressure vest is filled with breathable air from the air supply. With each breathing cycle, the air in the pressure vest is partly exhausted to the environment, i.e. breathable air in the pressure vest is exchanged slightly during breathing.

However, in existing life support systems it has been observed that pilots cannot stay conscious in critical situations where a decompression event and heavy impact like G loads occur.

BRIEF SUMMARY

It is object of the invention to enhance the existing life support systems and to prevent unconsciousness of the pilot in such critical situations.

According to the invention, a regulation valve for a life support system for use in an aircraft cabin comprises: a gas inlet for breathable gas, an air mask supply outlet connected to the gas inlet and adapted to direct breathable gas to an air mask, a pressure vest branch interconnected between the gas inlet and an opening for connecting to a pressure vest and adapted to direct breathable gas to and from the pressure vest, a decompression valve adapted to inhibit gas flow from the pressure vest branch to the air mask supply outlet if pressure in the aircraft cabin decreases below a predetermined value, a one-way valve adapted to inhibit gas flow from the pressure vest branch to the air mask supply outlet at a predetermined pressure difference between the pressure vest branch and the gas inlet and a one-way dump valve adapted to direct gas from the pressure vest branch to the environment at the predetermined pressure difference between the pressure vest branch and the gas inlet.

It has been discovered by the invention, that in case of rapid decompression in a state of the art life support system, the direct connection of the pressure vest with the breathable gas channel through the T-piece leads to a dead volume of air with low oxygen concentration in the pressure vest. This dead volume of air first must be consumed, i.e. inhaled and exhaled, by the pilot. A fast supply with air of high oxygen concentration is hindered by this setup. This is identified as a significant factor of a delay in the supply of air with high oxygen concentration to the pilot and, thereby, as a reason for a possible unconsciousness of the pilot.

The regulation valve of the invention provides for a direct supply of oxygen enriched air to the pilot. Moreover, it allows that in a short period of time, the air in the pressure vest with low oxygen concentration is exchanged with high oxygen concentration air.

According to a first preferred embodiment, the regulation valve further comprises a pressure feed duct adapted to direct pressurized air from the gas inlet to the dump valve in a way that the dump valve opens at the predetermined pressure difference between the pressure vest branch and the gas inlet. Such pressure feed duct could be provided as an internal channel within a valve housing or as a tube or pipe connected to an inlet and/or an outlet of such a valve housing. Thereby, a self-controlled and purposeful way of regulating the dump valve is provided.

According to a further embodiment, the decompression valve is connected to a membrane which is coupled to the pressure in the aircraft cabin in a way that the decompression valve closes if the pressure in the aircraft cabin decreases rapidly. Thereby, a direct and intelligent way of controlling the decompression valve depending on the pressure in the aircraft, e.g. the cabin pressure is achieved.

A further embodiment is characterized in that a space on one side of the membrane is connected with an opening to the aircraft cabin in a way that a pressure difference between two sides of the membrane is compensated after a predetermined time for opening the decompression valve.

In particular, it is preferred that the membrane is embedded in a membrane housing. On each side of the membrane, a space is connected to the aircraft cabin by an opening in the membrane housing. The openings can have different sizes of cross section. The membrane is arranged in a way that in case of rapid decompression the pressure on a first side of the membrane decreases rapidly and on a second side of the membrane decreases slowly since the opening on the second side in the housing is smaller than the opening on the first side in the housing. When the pressure on the second side of the membrane has decreased sufficiently, the decompression valve opens.

A further preferred embodiment is characterized in that the decompression valve, the one-way valve and/or the one-way dump valve are integrated in a valve housing, preferably in the pressure vest branch.

Preferably, the gas inlet selectively receives breathable gas from an on-board oxygen generating system and/or from an oxygen backup unit which provides breathable air with a high oxygen concentration. During normal operation, i.e. normal pressure conditions in the aircraft cabin, the gas inlet receives breathable gas from the on-board generating system with a reasonable oxygen concentration and pressure, e.g. depending on the current altitude of the airplane. The on-board oxygen generating system can be supplied with air from a bleed air source. The bleed air can be obtained from the aircraft engine. Thereby, separate air container tanks for the supply of breathable are during normal operation are not necessary.

In case of a rapid decompression in the aircraft cabin the flow of breathable air from the on-board oxygen generating system to the gas inlet is inhibited. Furthermore, an oxygen backup unit is engaged to provide the gas inlet with breathable gas having a high oxygen concentration. The oxygen backup unit can obtain breathable gas from an oxygen tank with dimensions adapted for providing enough oxygen during critical decompression situations.

A further aspect of the invention is a life support system for use in an aircraft cabin comprising: a pressure vest, an air mask, a breathing regulator comprising a gas regulation inlet for breathable gas and a gas regulation outlet connected to a regulation valve and adapted to direct breathable gas to the regulation valve, wherein the breathing regulator is adapted to control the pressure in the regulation outlet (55), and the regulation valve comprising: a gas inlet for breathable gas, an air mask supply outlet connected to the gas inlet and adapted to direct breathable gas to an air mask, a pressure vest branch interconnected between the gas inlet and an opening for connecting to a pressure vest and adapted to direct breathable gas to and from the pressure vest, a decompression valve adapted to inhibit gas flow from the pressure vest branch to the air mask supply outlet if pressure in the aircraft cabin decreases below a predetermined value, a one-way valve adapted to inhibit gas flow from the pressure vest branch to the air mask supply outlet at a predetermined pressure difference between the pressure vest branch and the gas inlet, and a one-way dump valve adapted to direct gas from the pressure vest branch to the environment at the predetermined pressure difference between the pressure vest branch and the gas inlet.

Thereby, a simple and safe system for supplying the pilot with breathable air in case of rapid decompression is provided.

The breathing regulator provides for a safe and comfortable supply of breathable air to the pilot through pressure control. Preferably, the breathing regulator is adapted to control the pressure in the regulation outlet according to the altitude of the aircraft. Therefore, the breathing regulator can make use of a pressure signal from a pressure sensor arranged the outside of the aircraft. Further preferably, the breathing regulator is adapted to control the pressure in the regulation outlet according to the pressure in the aircraft cabin. Thereby, the pressure of breathable gas directed to the air mask can be adapted to the pressure in the aircraft cabin.

A preferred embodiment comprises an anti-g regulator unit adapted to direct pressurized gas to an anti-g suit which is supplied with gas from the breathing regulator and wherein the anti-g regulator unit is coupled to the breathing regulator in a way that the anti-g suit is pressurized if the breathable gas pressure is increased. This provides for life support of the pilot in critical situations, especially, with high levels of acceleration forces acting on the pilot.

According to a further preferred embodiment, the breathing regulator further comprises a pressure sensor and/or an oxygen sensor adapted to monitor the life support system, wherein an electronic control unit receives a pressure signal from the pressure sensor and/or an oxygen signal from the oxygen sensor for monitoring and/or controlling the breathing regulator. Thereby, for example, the system performance of the breathing regulator can be monitored. This provides for a simple and safe way of monitoring the pressure and the oxygen concentration of breathable air supplied to the regulation valve inlet and, therewith, the pilot. The electronic control unit can be supplied with power by an aircraft power supply.

Preferably, a display unit is adapted to provide information concerning the life support system to a pilot. This provides for information and monitoring means to the pilot. In case of system performance problems and failures, the pilot is enabled to trigger certain problem solving provisions. Preferably, the display unit is electrically connected to the electronic control unit in a way that the display unit can be controlled by the electronic control unit.

A further embodiment is characterized in that the life-support system further comprises an on-board oxygen generating system adapted to supply the breathing regulator with breathable gas and a bleed air source adapted to supply the on-board oxygen generating system with breathable gas. This provides for a simple and preferred means for providing oxygen to the life support system. Moreover a simple, effective and weight saving means for generating oxygen on-board is provided.

In another preferred embodiment, the life support system further comprises an oxygen backup unit adapted to supply the breathing regulator with breathable oxygen enriched air if the pressure in the aircraft cabin decreases, wherein the breathing regulator inhibits gas flow from the oxygen generating system if pressure in the aircraft cabin decreases. This provides for an alternative means for supplying oxygen to a pilot. Especially in case of rapid decompression in the aircraft cabin, the oxygen backup unit can be adapted to supply the pilot with breathable air of high oxygen concentration. Moreover, only oxygen enriched air from the oxygen backup unit is directed to the gas inlet of the regulation valve.

According to another embodiment the life support system further comprises an actuator adapted to close the decompression valve if the pressure in the aircraft cabin decreases rapidly. Thereby, an automated closing mechanism is provided for insulating the pressure vest in case of rapid decompression. Preferably, a pressure sensor is connected to an electronic control unit. If the pressure sensor detects a rapid decompression in the aircraft cabin, a corresponding signal is sent to the electronic control unit. The electronic control unit then activates an actuator which closes the decompression valve. After a predetermined time, the electronic control unit activates the actuator to open the decompression valve.

A further aspect of the invention is a method for operating a regulation valve for a life support system for use in an aircraft cabin, comprising the steps of:
  directing breathable gas from a gas inlet to an air mask supply outlet and to a pressure vest branch adapted to direct breathable gas to and from a pressure vest,
  insulating the pressure vest for a predetermined time if the pressure in the aircraft cabin decreases, in a way that gas flow from the pressure vest branch to the air mask supply outlet is inhibited,
  gas flow from the pressure vest branch is directed to the environment at a predetermined pressure difference between the pressure vest branch and the gas inlet and
  gas flow is directed to the pressure vest branch at a predetermined pressure difference between the gas inlet and the pressure vest branch.

In a preferred embodiment the method comprises the step of directing gas flow from the pressure vest branch to the air mask supply outlet at a predetermined time after insulating the pressure vest.

A further aspect of the invention is a method for operating a life support system for use in an aircraft cabin, comprising the steps of:
  directing breathable gas from a gas supply to an air mask and to a pressure vest and,
  if the pressure in the aircraft cabin decreases: directing oxygen enriched gas to the air mask and insulating the pressure vest, in a way that gas flow from the pressure vest to the air mask is inhibited, gas flow from the pressure vest is directed to the environment of the life support system and gas flow is directed to the pressure vest at a predetermined pressure difference between the gas supply and the pressure vest.

According to a preferred embodiment, the method comprises the step of directing gas flow from the pressure vest to the air mask at a predetermined time after insulating the pressure vest.

Preferably, the method comprises the step of directing gas to an anti-g suit.

A preferred embodiment of the invention is described in connection with the Figures, wherein

DETAILED DESCRIPTION

Figure 1:
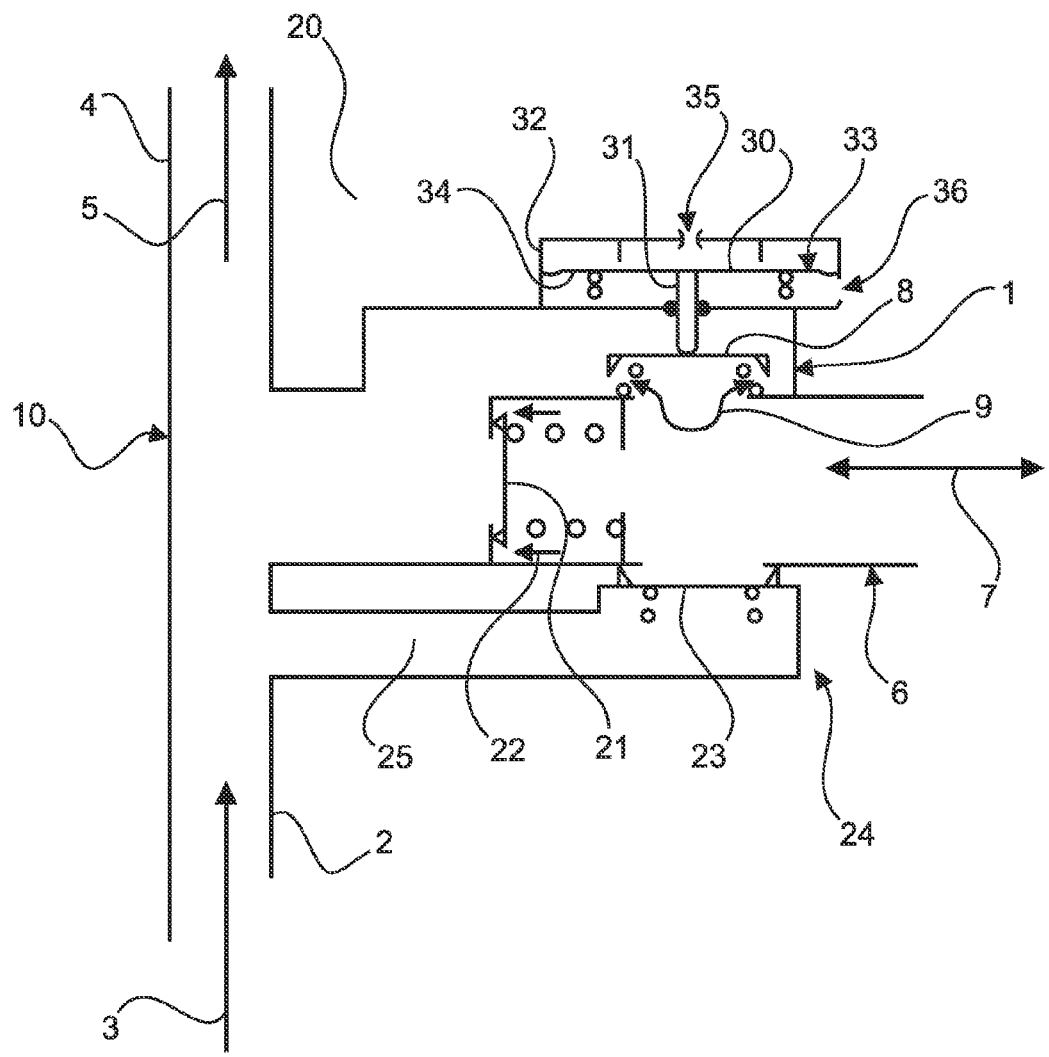
FIG. 1 is a schematic embodiment of a regulation valve according to the present invention and FIG. 2 is a schematic embodiment of a life support system according to the present invention.

FIG. 1 shows a regulation valve 1 according to a preferred embodiment of the invention comprising a gas inlet 2 for breathable gas 3 which originates from a breathing regulator not shown in FIG. 1. The regulation valve 1 further comprises an air mask supply outlet 4 for directing breathable gas 5 to an air mask not shown in FIG. 1. The gas inlet 2 and the air mask supply outlet 4 form a breathable gas branch 10. A pressure vest branch 6 is adapted to direct breathable gas 7 to and from a pressure vest not shown in FIG. 1.

The pressure vest branch 6 comprises a decompression valve 8 adapted to inhibit the gas flow 9 from the pressure vest branch 6 to the air mask supply outlet 4 if pressure in the aircraft cabin 20 decreases rapidly. The inhibition is achieved by closing the decompression valve 8.

The pressure vest branch 6 further comprises a one-way valve 21 adapted to open at a predetermined pressure difference between the breathable gas branch 10 and the pressure vest branch 6. When the one-way valve 21 is closed, gas flow 22 from the pressure vest branch 6 to the air mask supply outlet 4 is inhibited.

A one-way dump valve 23 is adapted to direct gas from the pressure vest branch 6 to the environment 24, e.g. the aircraft cabin at a predetermined pressure difference between the pressure vest branch 6 and the gas inlet 2. A pressure feed duct 25 is adapted to direct gas from the gas inlet 2 to the dump valve 23 in a way that the dump valve closes if the pressure difference between the gas inlet 2 and the pressure vest branch 6 reaches a predetermined value.

The decompression valve 8 is connected to a membrane 30 by a rod 31. The membrane 30 is coupled to the pressure in the aircraft cabin 20 in a way that the decompression valve 8 closes if the pressure in the aircraft cabin 20 decreases rapidly. This is achieved by a housing 32 which surrounds the membrane 30 wherein on each side 33 and 34 of the membrane 30 the housing 32 includes an opening 35 and 36, respectively. The opening 35 has a smaller cross-section than the opening 36 and thus functions as a throttle. During normal operation, a spring on the side 34 of the membrane 30 pushes the valve towards side 33 so that the decompression valve 8 is open. If the pressure in the aircraft cabin 20 decreases rapidly, the pressure on cabin 20 side of the membrane decreases rapidly according to the cabin pressure through opening and the decompression valve 8 closes. After a predetermined time the decompression valve opens up again after the low pressure has reached the other side of the membrane through opening 36 and thus the pressure difference between the two sides 33 and 34 of the membrane 30 is compensated after a predetermined time period.

The gas inlet 2 receives breathable gas 3 from an on-board oxygen generating system during normal operation. In a critical situation, e.g. when rapid decompression in the aircraft cabin occurs the gas inlet 2 receives breathable oxygen enriched air from an oxygen backup unit. Both systems are not shown in FIG. 1. The on-board oxygen generating system is supplied with bleed air from a bleed air source, e.g. an aircraft engine.

Figure 2:
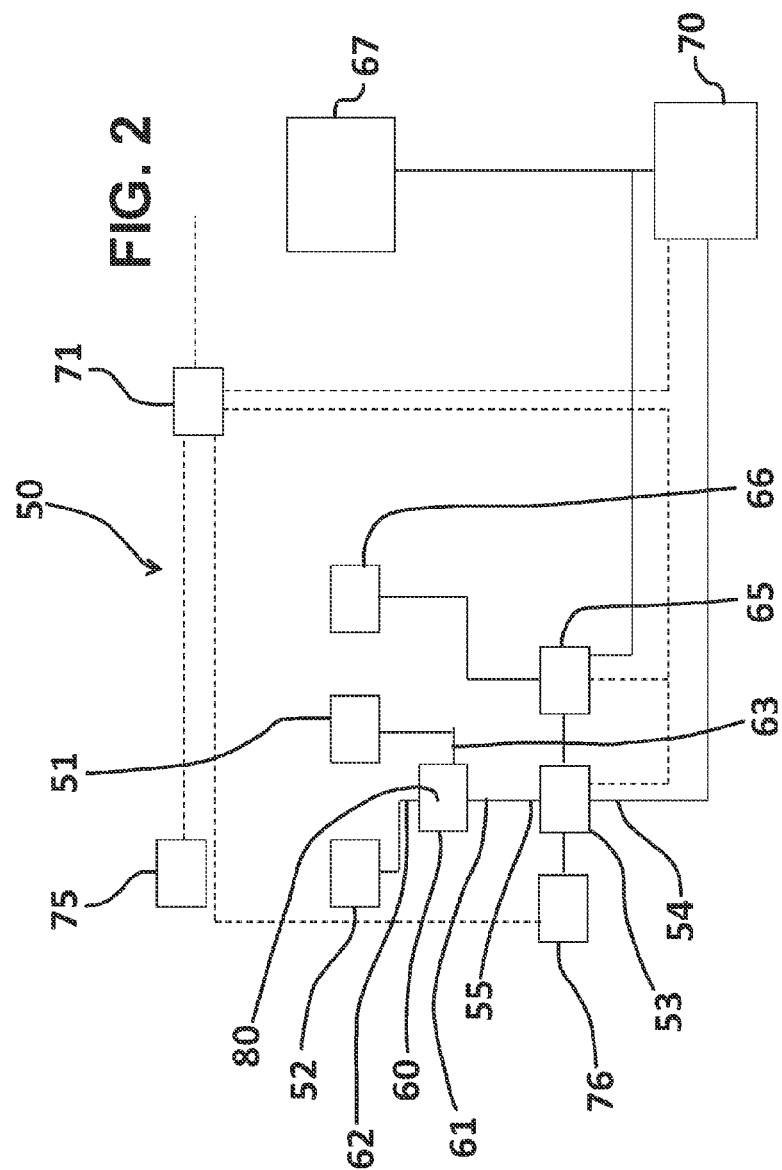

FIG. 2 shows a life support system 50 with a pressure vest 51 which can be worn by a pilot of the aircraft. An air mask 52 serves as an air supply for the pilot. A breathing regulator 53 comprises a gas regulation inlet 54 for breathable gas and a gas regulation outlet 55 adapted to direct breathable gas to a regulation valve 60. The breathing regulator 53 is adapted to regulate the breathable gas pressure according to the altitude of the aircraft.

The regulation valve 60 can comprise a gas inlet 61 for breathable gas and an air mask supply outlet 62 adapted to direct breathable gas to the air mask 52. The gas inlet 61 and the air mask outlet 62 form a breathable gas branch 80. Further, the regulation valve 60 comprises a pressure vest branch 63 adapted to direct breathable gas to and from the pressure vest 51. During normal operation the regulation valve 60 functions as a t-piece and serves as a direct connection of the gas inlet 61 with the gas outlet 62 and the pressure vest branch 63. Thus, the pressure vest serves under normal operation as a buffer to smooth system vibrations and, furthermore, as a breathing support for the pilot. The breathable gas, which flows into the vest during exhalation by the pilot, is pushed back into the system upon inhalation by the pilot.

The breathing regulator 53 comprises a pressure sensor adapted to monitor the system performance of the breathing regulator 53 and an oxygen sensor adapted to monitor the system performance of the breathing regulator 53.

An anti-g regulator unit 65 is adapted to direct pressurized air to an anti-g suit 66 which protects the pilot, for example, during curve maneuvers against high acceleration forces. Therefore, the anti-g suit is supplied with pressurized air from the anti-g regulator unit 65. The anti-g regulator unit 65 can be supplied with gas by the breathing regulator 53, e.g. by a direct pneumatic connection. Herein, the anti-g regulator unit 65 can be adapted to direct pressurized air to the anti-g suit 66 in case the breathing regulator 53 increases the pressure of the breathable gas directed to the regulation valve 60. Moreover the anti-g regulator unit 65 can be supplied with gas from a bleed air source 67. The bleed air source 67 can be an engine of the aircraft. Further, the anti-g regulator unit 65 can comprise pressure sensors for system monitoring functions.

An on-board oxygen generating system 70 is supplied with bleed air from the bleed air source 67. The bleed air is cleaned from free water, dust and contaminants in the on-board oxygen generating system 70. Further, the pressure of the bleed air is limited to an appropriate level. Pressure and temperature sensors can be installed in the on-board oxygen generating system 70 for system monitoring. The on-board oxygen generating system 70 is electrically connected to an electronic control unit 71 which is supplied with power by an aircraft power source. The electronic control unit 71 controls the on-board oxygen generating system 70.

In the on-board oxygen generating system 70 nitrogen contained in the bleed air is preferably separated from the air by a pressure swing adsorption and/or a pressure vacuum swing adsorption or other oxygen enriching methods. Thereby, oxygen enriched air can be produced and delivered to the breathing regulator 53.

The sensor signals of the pressure sensor and oxygen sensor arranged in the breathing regulator 53 are transmitted to the electronic control unit 71 for system monitoring. Measured system values or status signals may be sent to a display unit 75 adapted to provide information concerning system performance to a pilot.

In case of system failure, e.g. rapid decompression, the pilot or the electronic control unit 71 selects an oxygen backup unit 76 for supplying the breathing regulator 53 with oxygen directly, wherein the breathing regulator 53 can additionally increase the pressure of the breathable air directed to the regulation valve 60. Moreover, in case of rapid decompression the regulation valve 60 insulates the pressure vest branch 63 from the breathable gas branch 80 in one direction, i.e. gas can not flow from the pressure vest 51 to the breathable gas branch 80, for a time period of a few seconds. During this time period overpressure in the pressure vest 51, created either by decompression or pilot's inhalation, is directed to the environment 24. When the above mentioned period of time has lapsed, the regulation valve 60 returns to normal operation.

The invention claimed is:

1. A regulation valve for a life support system for use in an aircraft cabin comprising:
    a gas inlet for breathable gas,
    an air mask supply outlet connected to the gas inlet and adapted to direct breath-able gas to an air mask,
    a pressure vest branch interconnected between the gas inlet and an opening for connecting to a pressure vest and adapted to direct breathable gas to and from the pressure vest,
    a decompression valve adapted to inhibit gas flow from the pressure vest branch to the air mask supply outlet if pressure in the aircraft cabin decreases below a predetermined value,
    a one-way valve adapted to inhibit gas flow from the pressure vest branch to the air mask supply outlet at a predetermined pressure difference between the pressure vest branch and the gas inlet, and
    a one-way dump valve adapted to direct gas from the pressure vest branch to the environment at the predetermined pressure difference between the pressure vest branch and the gas inlet.

2. The regulation valve of claim 1, further comprising a pressure feed duct adapted to direct pressurized air from the gas inlet to the dump valve in a way that the dump valve opens at the predetermined pressure difference between the pressure vest branch and the gas inlet.

3. The regulation valve of claim 1, wherein the decompression valve is connected to a membrane which is coupled to the pressure in the aircraft cabin in a way that the decompression valve closes if the pressure in the aircraft cabin decreases rapidly.

4. The regulation valve of claim 3, wherein a space on one side of the membrane is connected with an opening to the aircraft cabin in a way that a pressure difference between two sides of the membrane is compensated after a predetermined time for opening the decompression valve.

5. The regulation valve of claim 1, wherein the decompression valve, the one-way valve and/or the one-way dump valve are integrated in the pressure vest branch.

6. A life support system for use in an aircraft cabin comprising:
    a pressure vest,
    an air mask,
    a breathing regulator comprising
        a gas regulation inlet for breathable gas and
        a gas regulation outlet connected to a regulation valve and adapted to direct breathable gas to the regulation valve, wherein the breathing regulator is adapted to control the pressure in the regulation outlet, and
    the regulation valve comprising:
        a gas inlet for breathable gas,
        an air mask supply outlet connected to the gas inlet and adapted to direct breathable gas to the air mask,
        a pressure vest branch interconnected between the gas inlet and an opening for connecting to a pressure vest and adapted to direct breathable gas to and from the pressure vest,
        a decompression valve adapted to inhibit gas flow from the pressure vest branch to the air mask supply outlet if pressure in the aircraft cabin decreases below a predetermined value,
        a one-way valve adapted to inhibit gas flow from the pressure vest branch to the air mask supply outlet at a predetermined pressure difference between the pressure vest branch and the gas inlet, and
        a one-way dump valve adapted to direct gas from the pressure vest branch to the environment at the predetermined pressure difference between the pressure vest branch and the gas inlet.

7. The life support system of claim 6, wherein an anti-g regulator unit adapted to direct pressurized gas to an anti-g suit is supplied with gas from the breathing regulator, and wherein the anti-g regulator unit is coupled to the breathing regulator in a way that the anti-g suit is pressurized if the breathable gas pressure is increased.

8. The life support system of claim 6, further comprising a pressure sensor and/or an oxygen sensor adapted to monitor the life support system, wherein an electronic control unit receives a pressure signal from the pressure sensor and/or an oxygen signal from the oxygen sensor for monitoring and/or controlling the breathing regulator.

9. The life support system of claim 6, further comprising an on-board oxygen generating system adapted to supply the breathing regulator with breathable gas, and a bleed air source adapted to supply the on-board oxygen generating system with breathable gas.

10. The life support system of claim 9, further comprising an oxygen backup unit adapted to supply the breathing regulator with breathable oxygen enriched air if the pressure in the aircraft cabin decreases, wherein the breathing regulator inhibits gas flow from the oxygen generating system if pressure in the aircraft cabin decreases.

11. The life support system of claim 6, further comprising an actuator adapted to close the decompression valve if the pressure in the aircraft cabin decreases rapidly.

* * * * *